United States Patent [19]

Funaki et al.

[11] Patent Number: 4,867,528
[45] Date of Patent: Sep. 19, 1989

[54] PRESSURE-RESISTANT SHEATH OF A SUBMARINE OPTICAL FIBRE CABLE AND METHOD FOR THE PRODUCTION THEREOF

[75] Inventors: Kiyoshi Funaki; Kenichi Mochizuki; Jiro Ikeda, all of Tokyo; Masatsugu Murao, Higashiosaka; Mitsuaki Murao, Higashiosaka; Yoshinori Murao, Higashiosaka; Kazuhiko Murao, Higashiosaka, all of Japan

[73] Assignees: Ocean Cable Co., Ltd., Tokyo; Seitei Co., Ltd., Osaka, both of Japan

[21] Appl. No.: 26,365

[22] PCT Filed: Jun. 13, 1986

[86] PCT No.: PCT/JP86/00296
§ 371 Date: Jan. 7, 1987
§ 102(e) Date: Jan. 7, 1987

[87] PCT Pub. No.: WO86/07469
PCT Pub. Date: Dec. 18, 1986

[30] Foreign Application Priority Data

Jun. 14, 1985 [JP] Japan .................................. 60-128044
Sep. 20, 1985 [JP] Japan .................................. 60-209288

[51] Int. Cl.⁴ .............................................. G02B 6/44
[52] U.S. Cl. ............................................... 350/96.23
[58] Field of Search ..................................... 350/96.23

[56] References Cited

U.S. PATENT DOCUMENTS

| | | | |
|---|---|---|---|
| 4,278,835 | 7/1981 | Jackson | 350/96.23 |
| 4,408,828 | 10/1983 | Le Noane et al. | 350/96.23 |
| 4,422,718 | 12/1983 | Nakagome et al. | 350/96.23 |
| 4,676,590 | 6/1987 | Priaroggia | 350/96.23 |
| 4,697,875 | 10/1987 | Priaroggia | 350/96.23 |
| 4,726,649 | 2/1988 | Funaki et al. | 350/96.23 |

FOREIGN PATENT DOCUMENTS

| | | |
|---|---|---|
| 0060061 | 9/1982 | European Pat. Off. . |
| 0148447 | 7/1985 | European Pat. Off. . |
| 2502831 | 10/1982 | France . |
| 1424672 | 2/1976 | United Kingdom . |

*Primary Examiner*—Stanley D. Miller
*Assistant Examiner*—Richard Roseen
*Attorney, Agent, or Firm*—Armstrong, Nikaido, Marmelstein, Kubovcik & Murray

[57] ABSTRACT

Cross-sectionally fan-shaped metal segments 10a, 10b and 10c, shown in FIG. 1, are longitudinally assembled along an optical fibre to form a pressure-resistant sheath 10 for protecting an optical fibre unit for use in a transmission medium of a submarine optical fibre cable. The inner surfaces 11a, 11b, and 11c, shown in FIG. 1, of the metal segments 10a, 10b and 10c as well as all the contact faces 12a, 12b, and 12c also shown in FIG. 1 are so roughened that the adhesion force associated with the optical fibre unit 1 and the pressure-resistant sheath 10 and the metal segments themselves 10a, 10b and 10c can be strengthened enough to protect the optical fibre unit. Water penetration which may occur in case of cable damages can also be prevented.

6 Claims, 7 Drawing Sheets

PRESSURE-RESISTANT SHEATH OF A SUBMARINE OPTICAL FIBRE CABLE AND METHOD FOR THE PRODUCTION THEREOF

This is a continuation of PCT International Application PCT/JP86/00296 filed June 13, 1986.

TECHNICAL FIELD

This invention relates to a submarine optical fibre cable using an optical fibre as a transmission medium and in particular, to a pressure-resistant sheath for protecting the submarine optical fibre (unit) and a method for the production thereof.

BACKGROUND ART

Optical fibres have many characteristics such as low attenuation, wide frequency band and low weight, and are economically used in submarine cables for a long-distance transmission of large amounts of information.

Figures 13, 14:
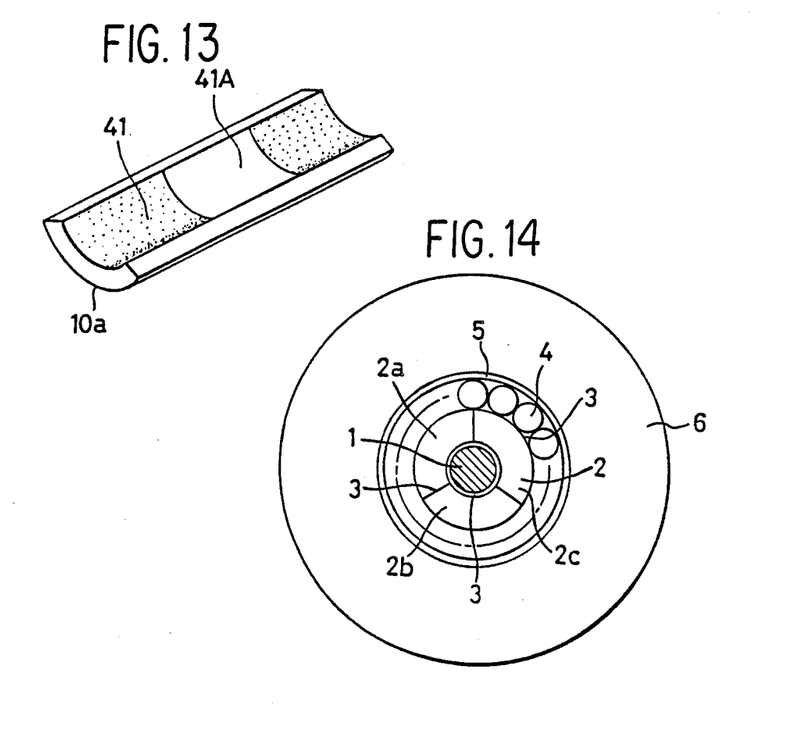
FIG. 14 is a transverse sectional view of a well-known submarine optical fibre cable.

FIG. 14 illustrates a sectional view of a submarine optical fibre cable. An optical fibre unit 1 is protected from high water pressure by a pressure-resistant metal sheath 2 which is used as an electrical power feeding conductor as well. The metal sheath 2 is composed of three units of fan-shaped segments 2a, 2b and 2c disposed longitudinally along the optical fibre. Spaces 3 between the segments are filled with a compound. Tension wires 4 are wound on the outer surface of the pressure-resistant sheath 2. A metal tube 5 is provided to hold the tension wires. A cover 6 is made of plastic insulating material and is sometimes covered by an exterior material to prevent cable damage. All the spaces associated with those components as described above are filled with the compound to prevent water from entering the metal.

The use of the segments 2a, 2b and 2c in the pressure-resistant sheath is described in Japanese Post-Exam Publication No. 7361/1984. According to the specification of the Publication, the pressure-resistant sheath 2 can be made thick enough to protect the optical fibre unit 1 from a high water pressure because the sheath 2 is composed of fan-shaped segments 2a, 2b and 2c disposed longitudinally along the optical fibre unit 1. In addition, since no heat treatment is necessary for the production of the pressure-resistant sheath, the transmission characteristics of the optical fibre are not impaired at all. Furthermore, the sheath itself can function as a tension member as well.

However, the metal segments 2a, 2b and 2c to form a pressure-resistant sheath 2 must be highly polished to provide intimate contact among the segments. No difference in the level of the contact faces shall be allowed. Since the metal segments 2a, 2b and 2c are only disposed longitudinally along the optical fibre, bending stresses often cause a gap between these segments to result in water ingress into the pressure-resistant sheath 2 even if the inside of the sheath 2 has been filled with a compound. In particular, the pressure-resistant sheath 2 is very weakly bonded to the optical fibre unit 1 because high lateral pressures cannot be applied to the optical fibre unit. Thus, water is likely to penetrate into the contact faces of the unit 1 and the sheath 2 as well as the segments 2a, 2b and 2c.

Thus, the object of this invention is to provide a pressure-resistant sheath for submarine optical fibre cables wherein the adhesion force associated with the pressure-resistant sheath 2 and the segments 2a, 2b and 2c is so strengthened that the optical fibre unit 1 can be thoroughly protected from various stresses imposed at the stage of manufacturing and aging experienced after manufacturing.

Another object of the present invention is to provide a method for the production of a pressure-resistant sheath for a submarine optical fibre cable as described above.

DISCLOSURE OF THE INVENTION

According to the present invention, the inner and/or joint surfaces of the fan-shaped segments to form a pressure-resistant sheath for a submarine optical fibre cable are roughened, stained or jagged. When the segments are longitudinally disposed around the outer surface of the optical fibre unit to form a pressure-resistant sheath, the adhesion force associated with the optical fibre unit and the pressure-resistant sheath and the segments themselves is strengthened because of the effect of roughened surfaces. Therefore, water penetration which may occur in case of cable damage can be prevented using the construction of this invention. In addition, because of the increased adhesion force, a gap or discrepancy around the segments is unlikely to form at the stage of production and at a later stage when bending stresses are imposed on the cable. Thus, the optical fibre unit covered by the pressure-resistant sheath of the present invention is securely protected from the high water pressure surrounding the cable.

BEST MODE FOR CARRYING OUT THE INVENTION

Figure 1:
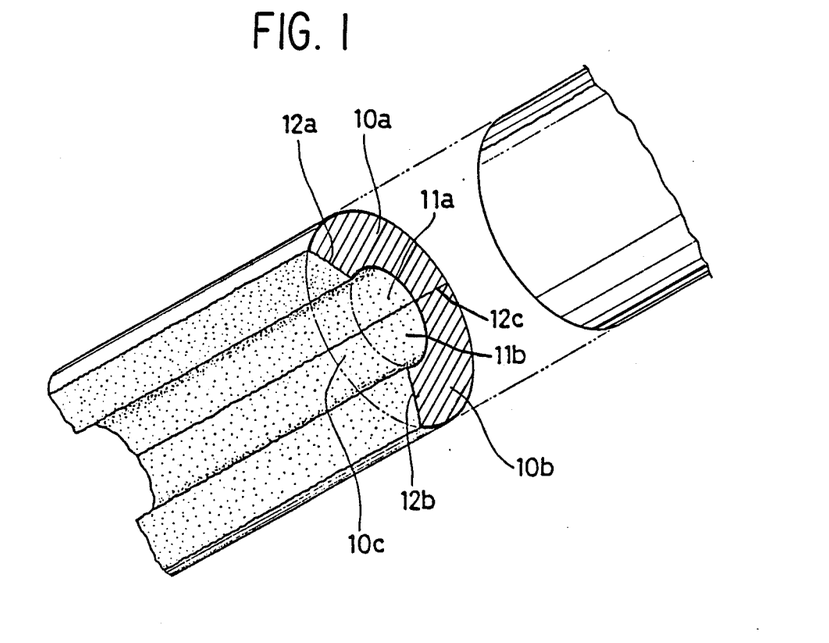
FIG. 1 is a perspective illustration of a pressure-resistant sheath for use in a submarine optical fibre cable of the present invention.

FIG. 1 is a perspective view of the construction of a pressure-resistant sheath. Three identical members 10a, 10b and 10c are fan-shaped metal segments. The segment 10c is shown in a chain line so that the side and inner surfaces of the other metal segments 10a and 10b can be seen. The center angle of the segments 10a, 10b and 10c is approximately 120°. The inner surfaces 11a, 11b and (11c) have a roughness height of about 0.005 to 0.02 mm. In addition, the side surfaces 12a, 12b and (12c) of the metal segments 10a, 10b and (10c) are also roughened.

Figure 2:
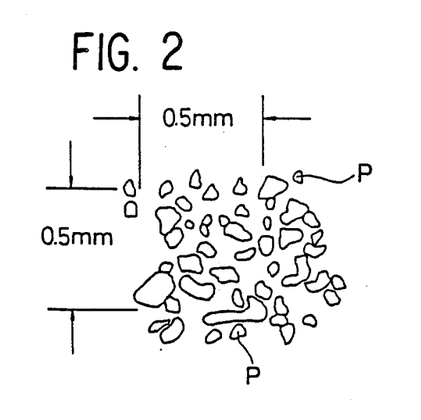
FIG. 2 is a pictorial view of a roughened surface of a segment for use in the pressure-resistant sheath of the present invention.
Figure 3:
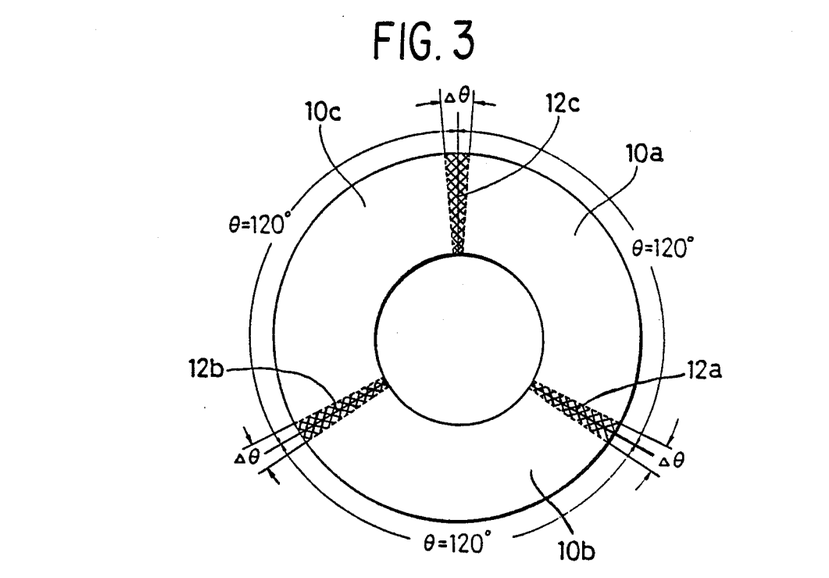
FIG. 3 illustrates a cross-sectional view of the pressure-resistant sheath.

The metal segments 10a, 10b and 10c can be produced using work rolls which have been roughened by shot blasting in advance. In order to produce a pressure-resistant sheath with a diameter of 3.0 mm, for example, a 10-mesh shot blast is preferably used to provide an irregularity of 80 to 100 points/mm² as shown in FIG. 2. The metal segments 10a, 10b and 10c having roughened surfaces 11a, 11b, 11c, 12a, 12b, and 12c are longitudinally disposed along an optical fibre unit and then wound by tension wires. Owing to the effect of the jagged surfaces, the side surfaces 12a, 12b and 12c of the metal segments 10a, 10b and 10c are securely bonded to each other surface. As shown in FIG. 3, the roughened surfaces of the side areas 12a, 12b, and 12c of the metal segments 10a, 10b and 10c often shrink by a degree of $\Delta\theta$, and it is preferable that the center angle of the metal segment be increased in advance by a degree of $\Delta\theta$, depending on the roughness of the surface. Although the details of the calculation for the angle $\Delta\theta$ to be increased are omitted for simplicity, the angle for the surface roughness of 0.002 mm, 0.01 mm and 0.02 mm should be 0.2°, 0.4°, and 0.8°, respectively, when the segments are three pieces or the center angle $\theta$ is 120°.

As mentioned earlier, the side surfaces of the sheath segments of the present invention for use in submarine optical fibre cables are so roughened that the segments are strongly bonded to resist against the water pressure outside of the cable. Because of the increased adhesion force, any gap or discrepancy will not be formed at the stage of manufacturing or at a later stage when bending stresses are imposed on the cable. The optical fibre unit 1 is thus securely protected from the outside water pressure.

In general, those spaces around the roughened surfaces 11a, 11b, 11c, 12a, 12b and 12c are filled with compounds to prevent the sea water from entering. In addition, when the sea water finds its flow path in the longitudinal direction of a damaged cable, the roughened surfaces create a tortuous flow pathway due to the irregularities and the adhesion force between the sheath and the compound, resulting in greater resistance to water penetration.

Figure 4:
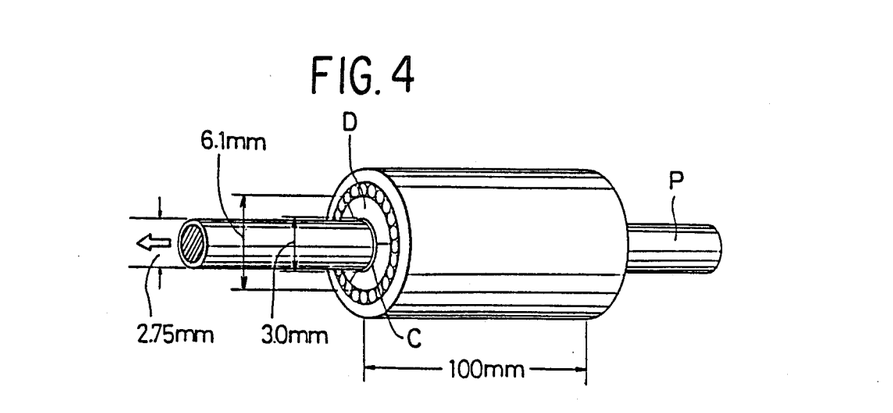
FIG. 4 shows the dimensions of the cable used in the adhesion force test.

Test results obtained with a submarine optical fibre cable of the present invention are described as below:

As shown in FIG. 4, an optical fibre unit P with an outer diameter of 2.75 mm was covered with a pressure-resistant sheath D with outer/inner diameters of 6.1 mm/3.0 mm and a length of 100 mm. A compound C for use in preventing water penetration was a two liquid-thermosetting urethane resin curable at room temperature. The following table shows the adhesion force between the optical fibre unit P and the pressure-resistant sheath D, wherein A refers to an optical fibre unit P which utilizes sheath segments having a conventional roughness of VVV to VVVV, and B refers to an optical fibre unit P which utilizes metal sheath segments with roughened surfaces of 0.02 mm in depth and 80 to 100 points/mm² in irregularity.

TABLE

| Samples | (A) Kg/mm | (B) Kg/mm |
| --- | --- | --- |
| No. 1 | 20 | 55 |
| No. 2 | 60 | 89 |
| No. 3 | 36 | 77 |
| No. 4 | 32 | 77 |
| No. 5 | 28 | 59 |
| No. 6 | 28 | 83 |

TABLE-continued

| Samples | (A) Kg/mm | (B) Kg/mm |
| --- | --- | --- |
| No. 7 | 44 | 91 |
| No. 8 | 38 | 72 |
| No. 9 | 60 | 76 |
| No. 10 | 42 | 54 |
| No. 11 | 22 | 76 |
| No. 12 | 36 | 86 |
| No. 13 | 43 | 81 |
| No. 14 | 51 | 49 |
| No. 15 | 27 | 105 |
| Average | 37.8 | 75.3 |

It is seen from the table that an average adhesion force of the conventional construction is only 37.8 kg/mm while that of the pressure-resistant sheath of the present invention is 75.3 kg/mm or about two times that of the conventional segments.

Figure 5:
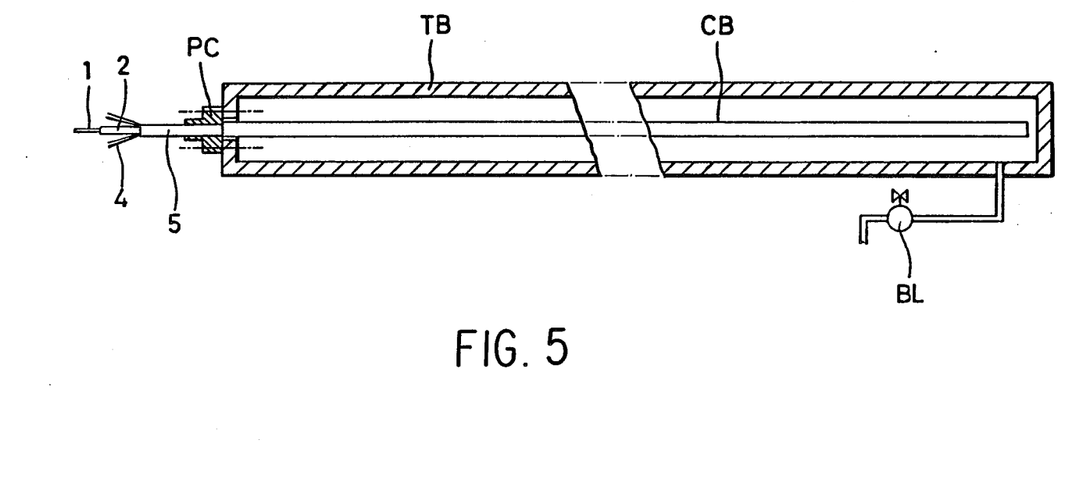
FIG. 5 is a drawing to illustrate the outline of the water penetration test.

Next, water penetration tests were conducted to show the effectiveness of this invention. The experimental procedure and the discussion of the results are described as below:

Referring to FIG. 5, water is pressurized to enter a pressure test tube TB with a length of about 100 m via a valve BL. A cable CB to be tested opened at one end was placed in the pressure test tube TB. The other end of the cable CB was treated by removing its insulating layer 6 and a metal tube 5 was hermetically connected with the pressure test tube TB by using a sealing device PC.

Water was first pumped to the pressure test tube to maintain a specified pressure of, for example, 750 kg/cm², 550 kg/cm², and 100 kg/cm². Water flowed from one end of the cable CB to the other end of the cable CB through crevices along the pressure-resistant sheath. The time required for the water droplets to travel from one end to the other end was measured with the results shown in FIG. 6.

Figure 6:
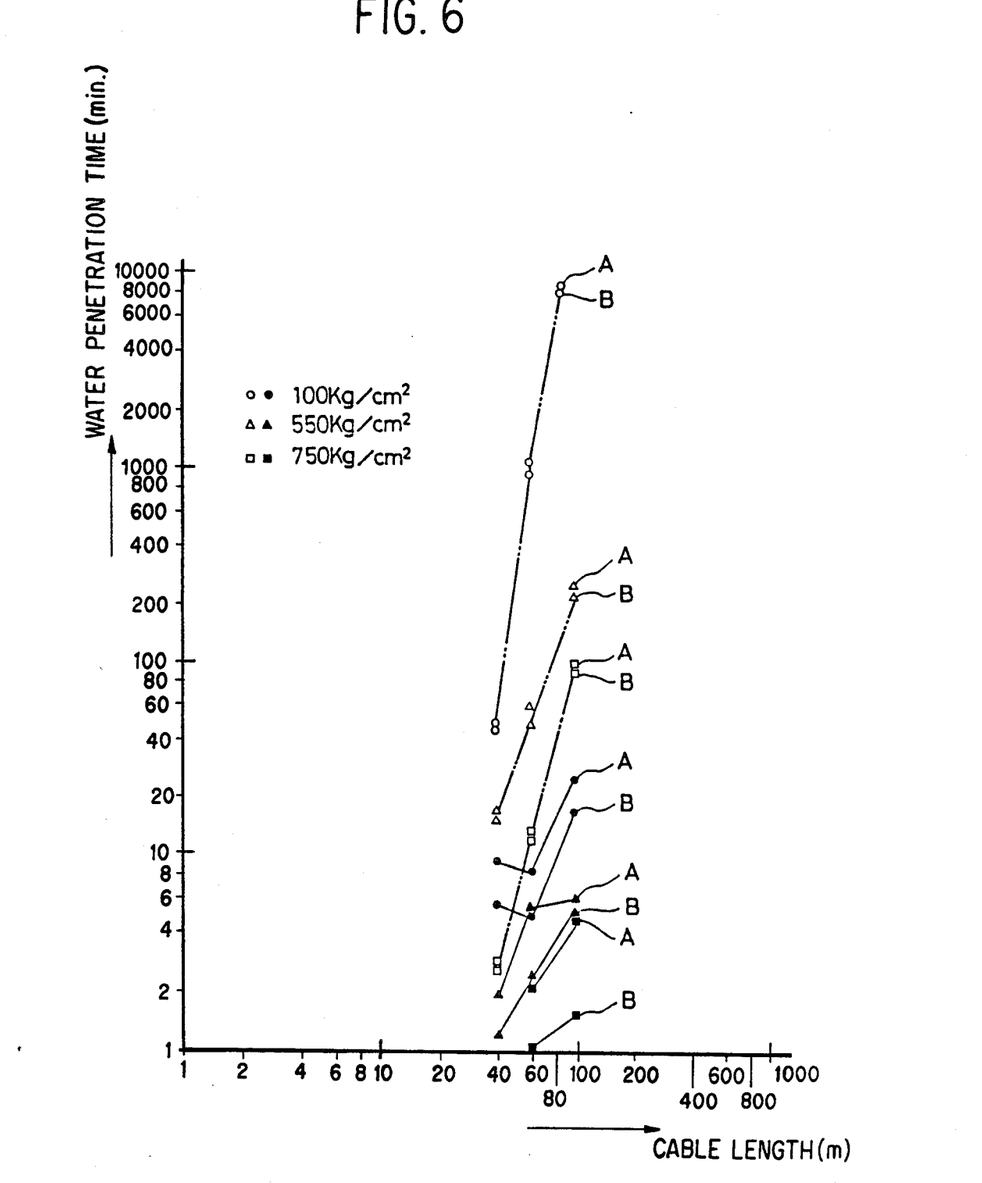
FIG. 6 is a graph showing the data obtained in the water penetration test.

Referring to FIG. 6, the water penetration time (min.) is plotted on the y-axis and the cable length (m) is plotted on the x-axis. Open symbols, , and □ refer to the cable with roughened surfaces of the present invention. Closed symbols, , and refer to the cable without roughened surfaces. Circles , , triangulars , , and squares □, refer to water pressures of 100 kg/cm², 550 kg/cm² and 750 kg/cm², respectively. A and B show different data obtained by repeating the test with the same test conditions.

It is seen from the data that all the cables of the present invention referred to as , and have a longer penetration time compared cable produced without roughened surfaces. This means good protection from water penetration. In addition, definite correlations can be found among time, length and pressure and this permits an accurate extrapolation of the results obtained. The use of these correlations allow one to make an exact prediction of the water penetration time for a cable with a greater length.

The conventional cables designated as , and , however have a shorter water penetration compared with the submarine optical fibre cable of this invention. In addition, the data obtained are scattered so widely that no reliable correlations can be obtained among the time, length and pressure.

The test data obtained with the pressure-resistant sheath of the present invention have been compared with the Hagen-Poiseuills' low: $L \propto At^\alpha p^{\frac{1}{2}}$
where L = water penetration length, m
t = water penetration time, min
p = water pressure, kg/cm²

Then, the following approximate equations with $\alpha=0.3$ have been derived:

$$L_{75} \approx 0.96\ t^{0.3}\ p^{0.5}\ @750\ kg/cm$$

$$L_{55} \approx 0.83\ t^{0.3}\ p^{0.5}\ @550\ kg/cm$$

$$L_{10} \approx 0.65\ t^{0.3}\ p^{0.5}\ @100\ kg/cm$$

The equations given above have been found to be in good agreement with the data obtained with cables different in length from the tested cables.

According to the current international standard for submarine optical fibre cables, the water penetration length L in a period of two weeks shall be not more than 250 m at a water pressure of 100 kg/cm², not more than 1000 m at a pressure of 550 kg/cm², and not more than 2000 m at a pressure of 750 kg/cm². Therefore, it has been proven by the data shown above that the submarine optical fibre cable using the pressure-resistant sheath of the present invention can meet the requirement of the current international standard.

Figure 7:
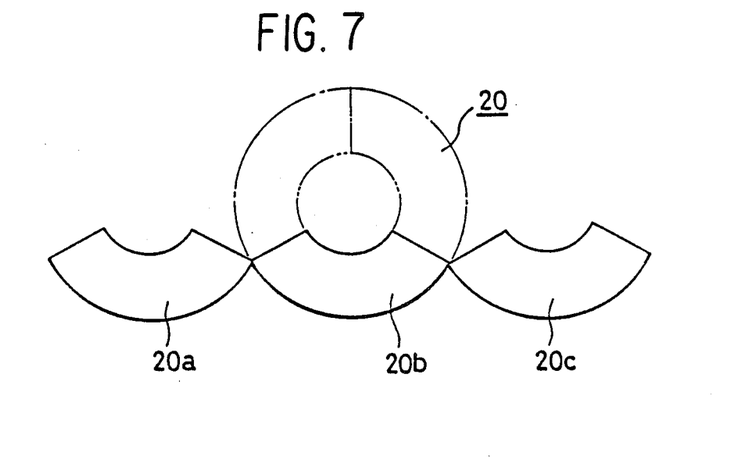
FIG. 7 is a view illustrating another embodiment of the sheath segment of this invention.

A pressure-resistant sheath 20 composed of three connecting segments 20a, 20b and 20c as illustrated in FIG. 7 has already been proposed by the present inventor (Japanese Laid-Open Publication No. 208710/1985) and can be used in this invention.

Figure 8:
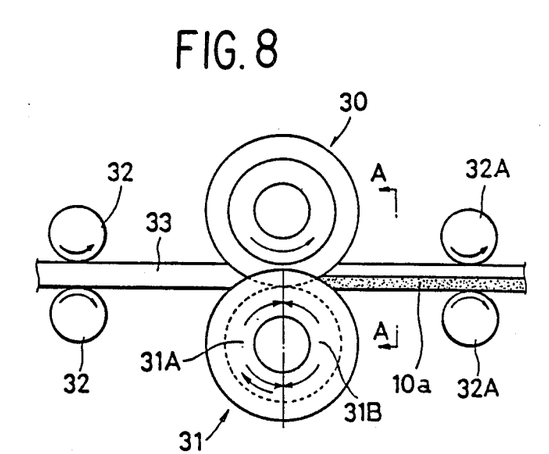
FIG. 8 illustrates a method of producing the sheath segment with a roughened surface.

FIG. 8 illustrates a method for the production of roughened surfaces for the segments constituting a pressure-resisting sheath of the present invention. The first work roll 30 has a smooth surface while the second work roll 31 has a roughened surface. Both of the rolls or cylinders 30 and 31 can revolve in directions as shown by arrows. The rolls can run idle and can also be driven to rotate at the same speed.

A pair of feed rolls 32 feed an approximately fan-shaped metal wire 33 into the first work roll 30 and the second work roll 31 while a pair of withdrawal rolls 32A withdraw the segment thus produced from the wire.

Figure 9:
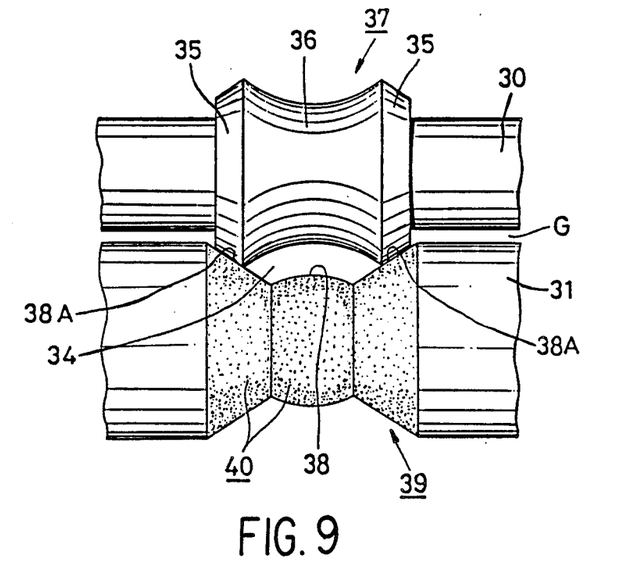
FIGS. 9 and 10 are front views of the work tools for the production of the pressure-resistant sheath.

FIG. 9 illustrates a pair of roll forming sections 37 and 39, between which the metal work passes. The forming section 37 on the first work roll 30 is composed of a pair of tapers 35 and a concave surface 36 while the forming section 39 on the second work roll 31 is composed of a pair of tapered surfaces 38A and a convex surface 38. When two rolls 30 and 31 rotate, along the tapered surfaces, a work path 34 is formed to provide the fan-shaped cross-section of the work.

In an embodiment of this invention as shown in FIG. 9, the tapered surfaces 38A and the convex surface 38 of the roll forming section 39 have roughened section 40 produced by, for example, shot blasting. The roughened surfaces 40 generally have an irregularity of 100 to 30 points/mm² and a roughness height of 0.01 to 0.1 mm.

Figure 10:
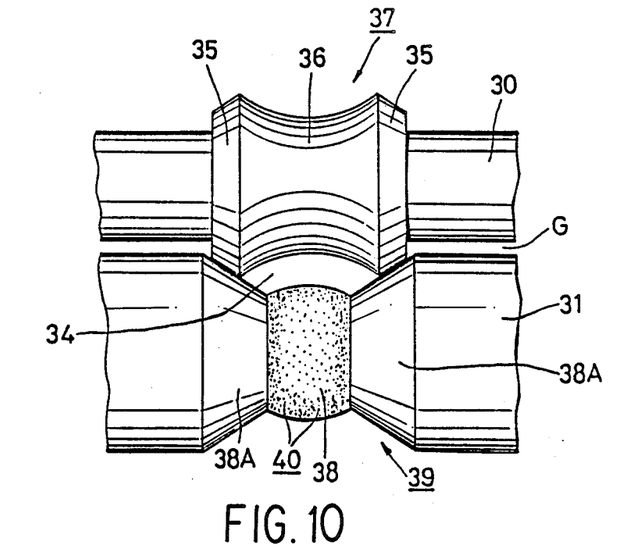

Another embodiment of this invention is shown in FIG. 10, where the corresponding sections are numbered in a similar manner as in FIG. 9. In this embodiment only the convex surface 38 of the roll forming section 39 is roughened to provide a jagged surface 40.

In each embodiment stated above, the roll forming sections 37 and 39 on the work rolls 30 and 31, respectively, define the work path 34 whose cross-section is a fan-like shape. The tapered surfaces 35 and 38A restrict the relative motion of the rolls and permit the self-centering of the rolls.

Figures 11, 12:
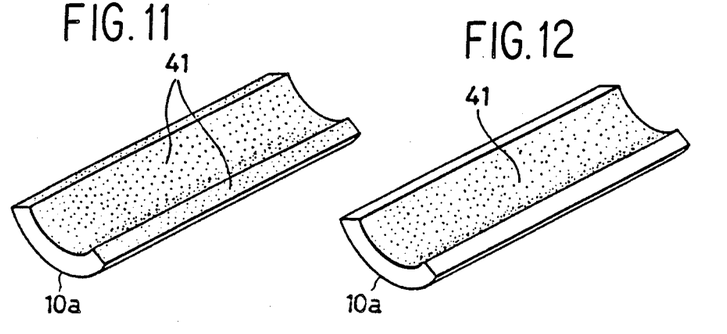
FIGS. 11, 12 and 13 are perspective views showing a part of the metal sheath segment with roughened surfaces.

Referring to the drawings described above, the metal wire 33 is first drawn or extruded to obtain a cross section of nearly a fan in shape. The wire is then continuously introduced into the work path 34 between the first roll 30 and the second work roll 31 via the feed roll 32. Roughened surfaces are formed as the wire is withdrawn via the withdrawing roll 32A. In a construction as illustrated in FIG. 9, roughened surfaces 41 are continuously formed on the inner and the side surfaces of the fan-shaped segments 10a, 10b and 10c as shown in FIG. 11. In a construction as illustrated in FIG. 10, roughened surfaces 41 are continuously formed only on the inner surfaces of the fan-shaped segments 10a, 10b and 100c as shown in FIG. 12.

In FIGS. 9 and 10 is roll gap G is shown, extent of which both or either of the first work roll 30 and the second work roll 31 can be biased using a pressure-control mechanism (not shown) to regulate compression pressure.

It is also suitable to form roughened zones 41 and polished zones 41A alternately in the longitudinal direction of the metal segment 10a (10b, 10c) as shown in FIG. 13. The metal segment of this type can be produced using the second work roll 31 as shown in FIG. 10. In this case section 31A as shown in FIG. 8 is roughened and section 31B as shown in FIG. 8 is polished so that roughened and polished zones are alternately formed around the second work roll 31. Referring to FIG. 9, the tapered surfaces 38A on the second work roll 31 can also be roughened and polished alternately, and it is possible to produce the metal segments 10a (10b, 10c), with all surfaces roughened and polished alternately as opposed to the inner surface only.

Although the first work roll 30 provides only a smooth surface in those example as presented above, the roll forming section 37 on the first work roll 30 can also be roughened. The use of this construction provides roughened surfaces 41 on the outer surface zone of the metal segment.

Industrial Applicability

The present invention is useful as intercontinental submarine optical fibre cable and exhibits high reliability due to the quality of the pressure-resistant cable sheath. In particular, cable damage or malfunction will be less likely to occur, resulting in increased economical benefits.

We claim:

1. A pressure-resistant sheath comprising,
   three cross-sectionally fan-shaped concentrically-positioned metal segments,
   wherein each of said metal segments has two contact faces and an inner surface, wherein each contact face of each metal segment abuts one contact face of each of the other two metal segments, and wherein said contact faces have a roughness which is uniform and continuous and has a roughness height of about 0.005 to 0.02 mm.

2. The pressure-resistant sheath of claim 1, wherein the inner surfaces of said metal segments have been roughened.

3. A pressure-resistant sheath, comprising:
   three cross-sectionally fan-shaped concentrically-positioned metal segments,
   wherein each of said metal segments has two contact faces, wherein each contact face of each metal segment abuts one contact face of each of the other two metal segments, wherein said metal segments are bound together by a plurality of tension wires, and wherein said contact faces have a roughness which is uniform and continuous.

4. The pressure-resistant sheath of claim 3, wherein a center angle of said metal segments is within the range of 120.1° to 121°.

5. A pressure-resistant sheath for protecting an optical fiber unit, comprising:

a plurality of metal segments each having a fan-shaped cross section, and defined by an inner surface, outer surface and abutting surfaces, said metal segment being arranged in abutting relationship with the abutting surfaces of one metal segment contacting with the abutting surfaces of adjacent metal segments, wherein at least one of said surfaces is roughened so as to have a roughness height of about 0.005 to 0.02 mm after at least partially forming the metal segments.

6. A pressure-resistant sheath, comprising:

three cross-sectionally fan-shaped concentrically-positioned metal segments, wherein each of said metal segments has two contact faces, wherein each contact face of each metal segment abuts one contact face of each of the other two metal segments, wherein said metal segments are bound together by a plurality of tension wires, wherein said contact faces have a roughness which is uniform and continuous, and wherein the inner surfaces have a roughness.

* * * * *